(12) United States Patent
Salter et al.

(10) Patent No.: US 11,904,743 B2
(45) Date of Patent: Feb. 20, 2024

(54) VEHICLE HAVING TRANSFORMABLE REAR SEAT

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Sean Bayle West, Monroe, MI (US); Johnathan Andrew Line, Northville, MI (US); Peter Phung, Windsor (CA); Kevin Wayne Preuss, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 408 days.

(21) Appl. No.: 17/335,394

(22) Filed: Jun. 1, 2021

(65) Prior Publication Data
US 2022/0379780 A1   Dec. 1, 2022

(51) Int. Cl.
| *B60N 2/30* | (2006.01) |
| *B60N 2/06* | (2006.01) |
| *B60N 2/07* | (2006.01) |
| *B60J 5/10* | (2006.01) |
| *B60N 2/882* | (2018.01) |
| *B60N 2/68* | (2006.01) |
| *B60N 2/879* | (2018.01) |

(52) U.S. Cl.
CPC ........... *B60N 2/3095* (2013.01); *B60N 2/065* (2013.01); *B60N 2/0735* (2013.01); *B60J 5/107* (2013.01); *B60N 2/07* (2013.01); *B60N 2/686* (2013.01); *B60N 2/879* (2018.02); *B60N 2/882* (2018.02)

(58) Field of Classification Search
CPC ........ B60N 2/3095; B60N 2/12; B60N 2/065; B60N 2/143; B60N 2/0735; B60J 5/104; B62D 33/03
See application file for complete search history.

(56) References Cited

U.S. PATENT DOCUMENTS 5,056,849 A * 10/1991 Norris, Jr. .............. B60N 2/203
                                                        296/65.05
5,927,679 A    7/1999 Hill
(Continued)

FOREIGN PATENT DOCUMENTS

JP        000H06901 U     1/1994

*Primary Examiner* — Jason S Morrow
(74) *Attorney, Agent, or Firm* — Vichit Chea; Price Heneveld LLP

(57) ABSTRACT

A vehicle includes a cabin interior, a floor, and a tailgate at the rear end of the cabin interior, wherein at least a portion of the tailgate pivots between a vertical closed position and a horizontal open position. The vehicle has a first seat track assembly is supported on the floor in the cabin interior, a second seat track assembly supported on the tailgate, and a seat assembly. The seat assembly including a first seat panel, a second seat panel, a bracket that allows the first seat panel and the second seat panel to pivot between a forward facing position and a rearward facing position, and a guide supporting the bracket on one of the first and second seat track assemblies, wherein the seat assembly may slide rearward along the first seat track assembly onto the second seat track assembly when the tailgate is in the open position.

19 Claims, 9 Drawing Sheets

(56) References Cited

U.S. PATENT DOCUMENTS

| | | | |
|---|---|---|---|
| 7,156,442 B2 * | 1/2007 | McManus | B60N 2/933 |
| | | | 296/65.09 |
| 9,108,533 B2 | 8/2015 | Suck et al. | |
| 9,469,215 B2 | 10/2016 | Mason et al. | |
| 9,694,741 B2 | 7/2017 | Salter et al. | |
| 10,737,588 B2 | 8/2020 | Fujita et al. | |
| 11,639,201 B2 * | 5/2023 | Selle | B62D 33/03 |
| | | | 296/51 |
| 11,691,547 B2 * | 7/2023 | Salter | B60N 2/3095 |
| | | | 296/64 |
| 11,731,535 B2 * | 8/2023 | Kondrad | B60N 2/06 |
| | | | 296/64 |
| 2004/0256894 A1 | 12/2004 | McManus et al. | |
| 2005/0253433 A1 | 11/2005 | Brown et al. | |
| 2009/0079248 A1 | 3/2009 | Keyser et al. | |
| 2016/0144744 A1 | 5/2016 | Jeong et al. | |
| 2019/0217748 A1 | 7/2019 | Krnja | |
| 2020/0269728 A1 | 8/2020 | Pelka | |
| 2021/0162887 A1 | 6/2021 | Taylor | |
| 2021/0178940 A1 | 6/2021 | Fakhoury | |
| 2022/0379780 A1 * | 12/2022 | Salter | B60N 2/3095 |

\* cited by examiner

US 11,904,743 B2

VEHICLE HAVING TRANSFORMABLE REAR SEAT

FIELD OF THE DISCLOSURE

The present disclosure generally relates to vehicles, such as motor vehicles, and more particularly relates to a vehicle rear seat that can be transformed from a forward facing seating configuration to a rearward facing seating configuration.

BACKGROUND OF THE DISCLOSURE

Motor vehicles are commonly equipped with front and rear rows of seats to provide seating for passengers. Some vehicles may be equipped with tailgate seating to allow one or more passengers to be seated at the rear end of the vehicle facing rearward with the rear tailgate open when the vehicle is parked. It would be desirable to provide for a rear seating arrangement for a vehicle that offers tailgate seating that is cost-effective and easy to use.

SUMMARY OF THE DISCLOSURE

According to a first aspect of the present disclosure, a vehicle is provided that includes a cabin interior, a floor, a tailgate at the rear end of the cabin interior, wherein at least a portion of the tailgate pivots between a vertical closed position and a horizontal open position, a first seat track assembly supported on the floor in the cabin interior, a second seat track assembly supported on the tailgate, and a seat assembly. The seat assembly includes a first seat panel that serves as a seat base in a forward facing seat position, a second seat panel that serves as a seat back in the forward facing seat position, a bracket that allows the first and second seat panels to pivot between the forward facing seat position and a rearward facing seat position, and a guide supporting the bracket on one of the first and second seat track assemblies, wherein the seat assembly may slide rearward along the first seat track assembly and onto the second seat track assembly when the tailgate is in the open position.

Embodiments of the first aspect of the disclosure can include any one or a combination of the following features:
- the tailgate comprises a lower tailgate and an upper tailgate, wherein the second seat track assembly is supported on the lower tailgate;
- the seat assembly extends rearward of a rear end of the lower tailgate when the lower tailgate is in the open position;
- the first seat track assembly comprises a first pair of seat tracks and the second seat track assembly comprises a second pair of seat tracks;
- the seat assembly may be stored on the tailgate assembly when the tailgate assembly is in the closed position;
- the guide comprises a roller and one or more spring biased supports, wherein the roller rolls within the track;
- the seat assembly further comprises a headrest, wherein the headrest may be removably attached to the first seat panel or the second seat panel;
- the headrest comprises an audio speaker;
- the first seat panel comprises a first connector for connecting onto a second connector on the floor of the vehicle when the seat assembly is in the forward facing seat position;
- the second seat panel comprises a third connector for connecting onto a fourth connector on the tailgate when the seat assembly is in the rearward facing seat position;
- the seat assembly is a rearward most seat assembly of the vehicle;
- the vehicle comprises first and second seat assemblies, each seat assembly having a first seat panel, a second seat panel, a bracket, and a guide that enables the bracket to slide on a first pair of the first track assemblies on the floor and a second pair of second track assemblies on the tailgate;
- the bracket allows the first seat panel and second seat panel to rotate together at an angle of about 90°; and
- the first seat panel serves as the seat back in the rearward facing seat position and the second seat panel serves as the seat based in the rearward facing seat position.

According to a second aspect of the present disclosure, a vehicle is provided that includes a cabin interior, a floor, a tailgate at the rear end of the cabin interior, wherein at least a portion of the tailgate pivots between a vertical closed position and a horizontal open position, a first seat track assembly comprising a first pair of seat tracks supported on the floor in the cabin interior, a second seat track assembly comprising a second pair of seat tracks supported on the tailgate, and a rear seat assembly. The rear seat assembly includes a first seat panel that serves as a seat base in a forward facing seat position and serves as a seat back in a rearward facing seat position, a second seat panel that serves as a seat back in the forward facing seat position and serves as the seat based in the rearward facing seat position, a bracket that allows the first seat panel and the second seat panel to pivot together at an angle of about 90° between the forward facing position and the rearward facing position, and a guide supporting the bracket on one of the first and second seat track assemblies, wherein the seat assembly may slide rearward along the first seat track assembly and onto the second seat track assembly when the tailgate is in the open position.

Embodiments of the second aspect of the disclosure can include any one or a combination of the following features:
- the tailgate comprises a lower tailgate and an upper tailgate, wherein the second seat track assembly is supported on the lower tailgate;
- the seat assembly extends rearward of a rear end of the lower tailgate when the lower tailgate is in the open position;
- the seat assembly may be stored on the tailgate assembly when the tailgate assembly is in the closed position;
- the guide comprises a roller and one or more spring biased supports, wherein the roller rolls within the track; and
- the seat assembly further comprises a headrest, wherein the headrest may be removably attached to the seat base or the seat back.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
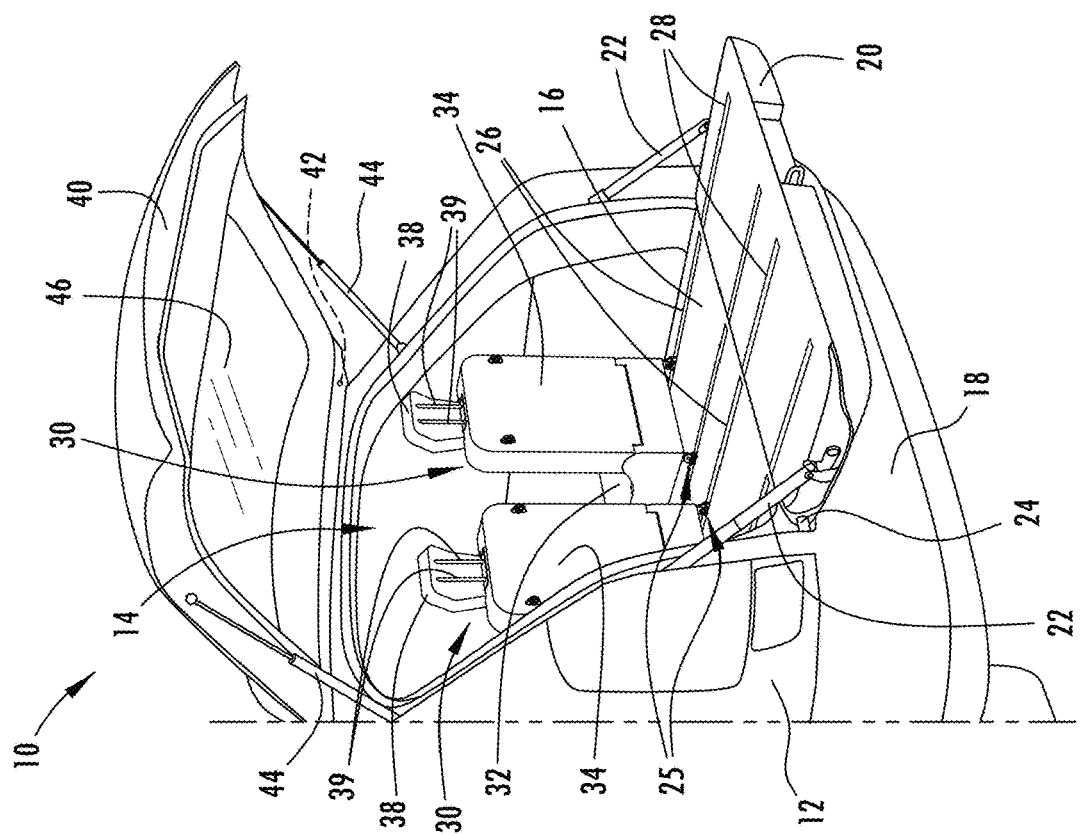
FIG. 1 is a rear perspective view of a motor vehicle having a rear row of seating including a pair of transformable rear seats shown in a forward facing seating configuration.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a transformable rear seat that offers tailgate seating. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
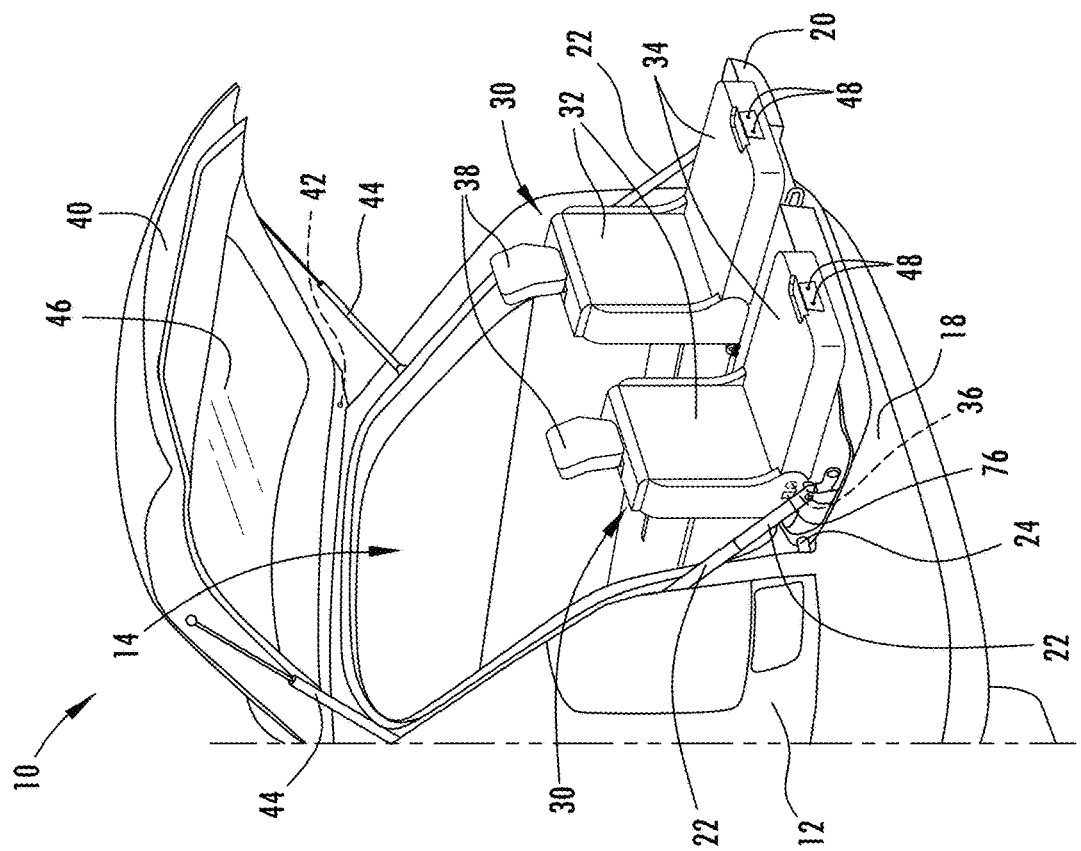
FIG. 2 is a rear perspective view of the motor vehicle having the transformable rear seats shown in a rearward facing seating configuration.

Referring to FIGS. 1 and 2, the cabin interior 14 of a wheeled automotive or motor vehicle 10 is generally illustrated configured with passenger seating for transporting passengers in the vehicle 10. The cabin interior 14 is generally defined by a vehicle body 12 and may contain various features and trim components within the vehicle body 12. The cabin interior 14 may include an arrangement of passenger seats including a first or front row of driver and passengers seats (not shown) at the front of the cabin interior 14 and a rearmost row of passenger seats 30 located rearward of the front row of passenger seats and closest to the rear end 18 of the vehicle 10 as compared to other seats. The rear row of passenger seat assemblies 30 includes a pair of seat assemblies 30 shown spaced apart from one another. However, it should be appreciated that the rear row of seating assemblies 30 may include one or more seat assemblies and may be configured as a bench or split bench seating arrangement. The vehicle 10 may also possess additional rows of seating between the front row of seating assemblies and the rearmost row of seating assemblies 30 as is the case in a typical large SUV, van or bus. The vehicle body 12 further defines a floor 16 upon which the seating arrangement is assembled. It should be appreciated that the vehicle 10 may be a motor vehicle, such as a wheeled car, truck, SUV, van or bus, for example, having a tailgate and capable of transporting one or more passengers in a forward seating position during vehicle transportation and in a rearward seating position during tailgate seating when the vehicle is parked.

The vehicle 10 includes a tailgate at the rear end 18 of the body of the vehicle 10. The tailgate is shown having a lower tailgate 20 at the rear of the cabin interior 14. In addition, the vehicle 10 has an upper tailgate 40 located above the lower tailgate 20. Together, the upper tailgate 40 and lower tailgate 20 define a tailgate closure that closes the space defined by the body 12 at the rear end of the vehicle 10 in the closed position and allows access to the cabin interior 14 in the open position. The lower tailgate 20 pivots between a horizontal open position shown in FIGS. 1 and 2 and a vertical closed position shown in FIGS. 3A and 3B. The lower tailgate 20 is pivotally connected to the vehicle body 12 via pivot pins 24 on opposite lateral sides and is supported in the horizontal open position by support arms 22 on opposite lateral sides of the lower tailgate 20. The upper tailgate 40 pivots about upper pivots 42 on opposite lateral sides and is supported in the open position by support arms 44 on opposite lateral sides. The lower and upper tailgates 20 and 40 may include latches that releasably connect onto the vehicle body in the closed position. It should be appreciated that the lower tailgate 20 and the upper tailgate 40 may be manually movable between open and closed positions or may be powered to move between the open and closed positions with one or more motors or may include assist mechanisms (e.g., springs) for assisting in moving the lower and upper tailgates 20 and 40 between the open and closed tailgate positions.

The vehicle 10 is equipped with a first seat track assembly 26 that is supported on the floor 16 in the cabin interior 14. The first seat track assembly 26 has a first pair of seat tracks 70 that extends parallel to one another along the top surface of the floor 16 on the rearward most portion of the cabin interior 14 and terminates at the rear end of the cabin interior 14 where the lower tailgate 20 is located. In addition, a second seat track assembly 28 extends on the interior side of the lower tailgate 20. The second seat track assembly 28 has a second pair of seat tracks 70 that terminate in close proximity to the end of the first seat track assembly 26. The second pair of tracks of the second seat track assembly 28 are aligned with the first pair of tracks of the first seat track assembly 26 as shown in FIG. 1 such that a small space exists between the adjoining ends of the first and second track assemblies 26 and 28. Two pairs of first and second seat track assemblies 26 and 28 are shown for structurally supporting the two seat assemblies 40. That is, each of the seat assemblies 30 may be supported and moved on separate pairs of first and second seat track assemblies 26 and 28.

Each of the rearward most seat assemblies 30 are configured as transformable seat assemblies that transform between a forward facing seat configuration or position shown in FIG. 1, where a passenger may be seated looking forward during normal vehicle driving, and a rearward facing seat configuration or position shown in FIG. 2, where a passenger may be seated with tailgate seating at the rearmost end of the vehicle 10 when the vehicle is parked with the tailgate open and the vehicle 10 is parked and not operating.

Figure 3A:
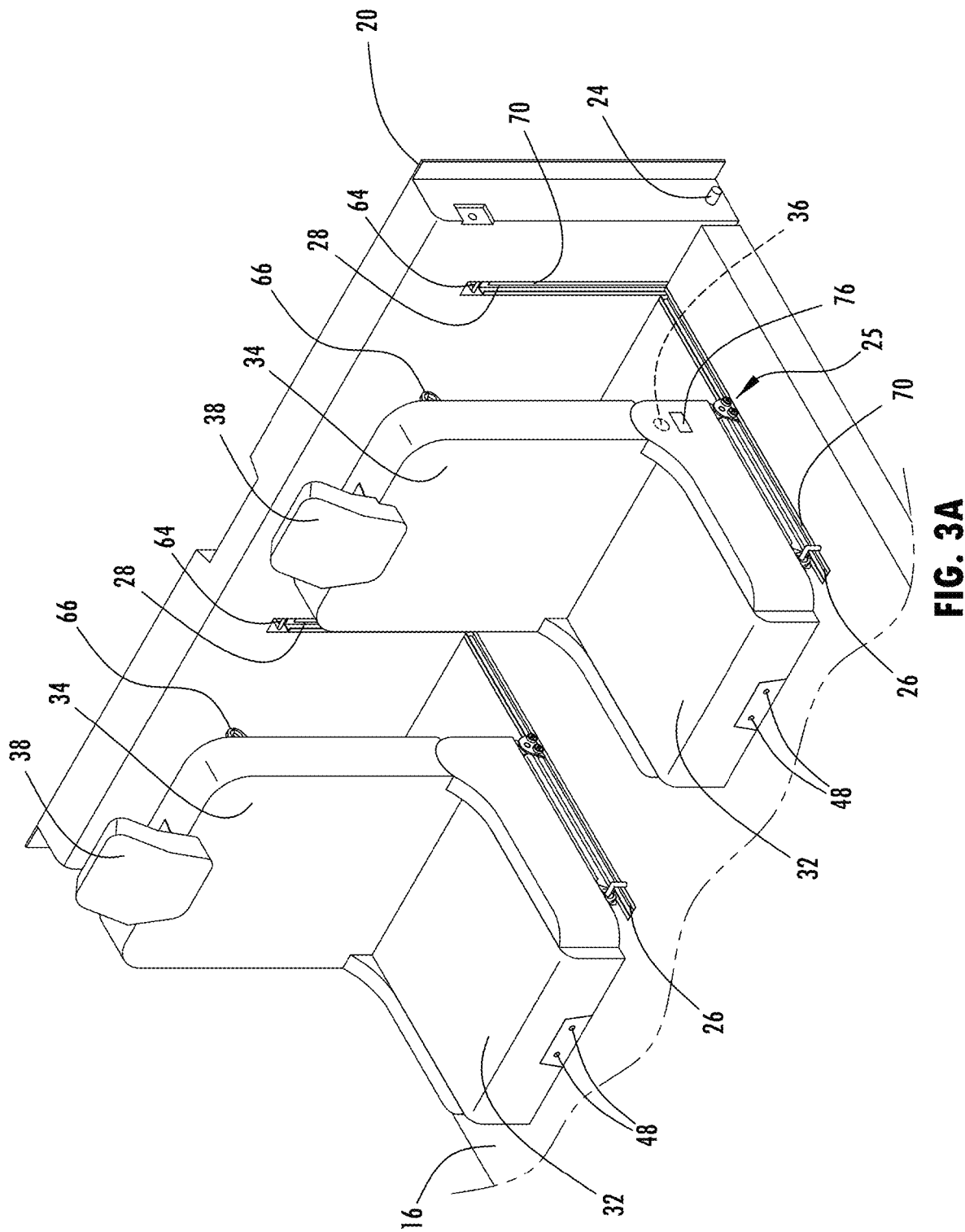
FIG. 3A is a front perspective view of the rear row of seating showing the seats in the forward facing position.
Figure 3B:
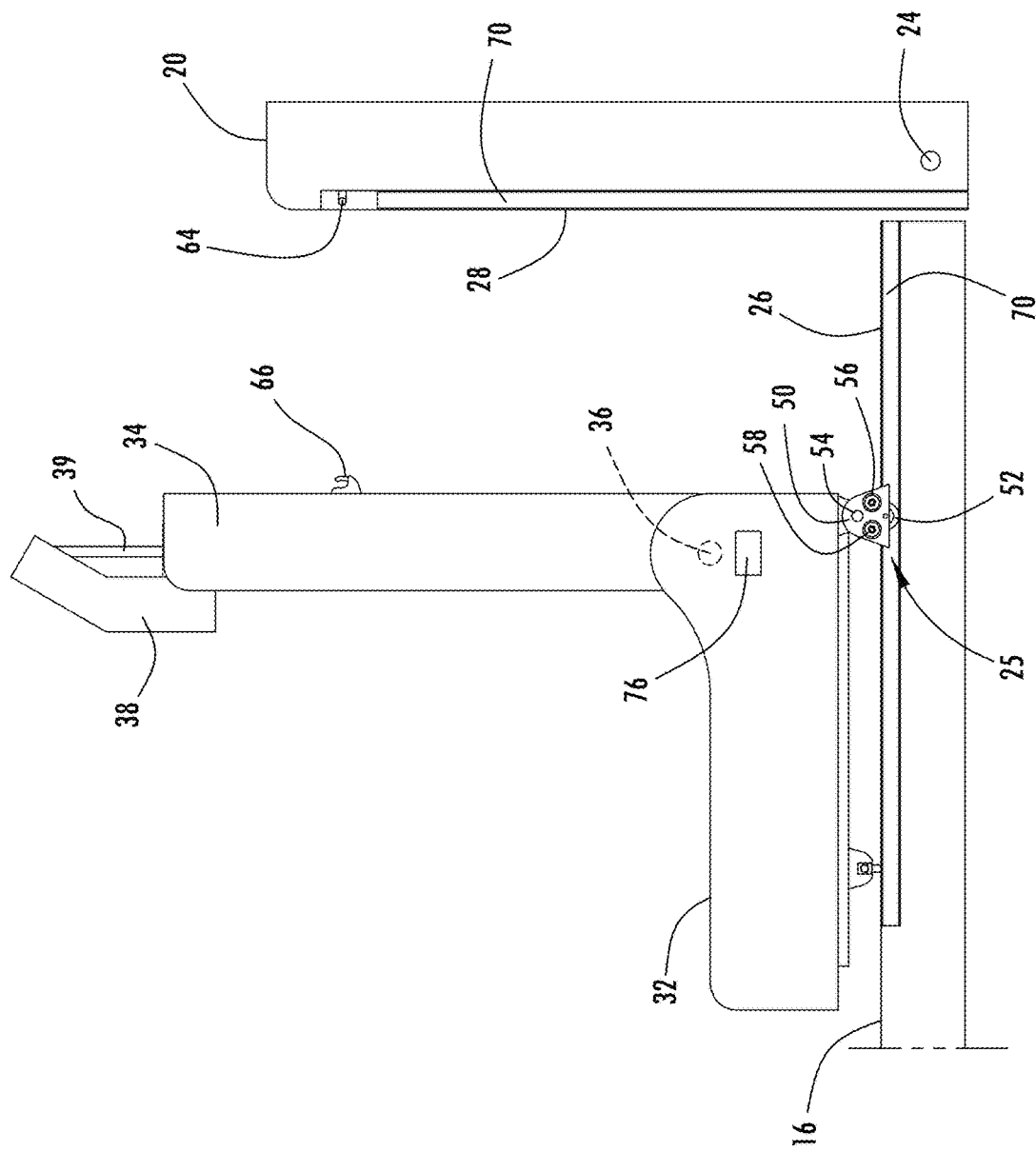
FIG. 3B is a side view of the rear row of seating in the forward facing position as shown in FIG. 3A.

The rear seat assemblies 30 are shown in FIGS. 3A and 3B oriented in the forward facing seat position configured to seat one or more passengers during normal vehicle driving. Each seat assembly 30 includes a first seat panel 32 and a second seat panel 34. The first seat panel 32 serves as a seat base when the seat assembly 30 is oriented in the forward facing seat position and the second seat panel 34 serves as the seat back when the seat assembly 30 is oriented in the forward facing seat position. The seat assembly 30 includes pivot pins or rods 36 that pivotally connect the first and second seat panels 32 and 34 together and allow for the first and second seat panels 32 and 34 to pivot relative to one another to adjust the seat back incline angle and allow the seat back to fold down to a folded position. A seat pivot control, such as a mechanically actuatable lever 76 or a switch for a motorized adjustable seat assembly, may allow for pivoting movement between the first and second seat panels 32 and 34.

The seat assembly 30 further includes a headrest 38 that may be connected onto either of the first or second seat panels 32 or 34 that serves as the back rest via headrest mounts 48. The headrest mounts 48 are shown as pairs of receiving holes on the ends of the first and second seat panels 32 and 34 for receiving a pair of support rods 39 on the headrest 38. The headrest 38 may include one or more audio speakers for outputting sound such as music which may be desired when used in the tailgating positions. The audio speakers may communicate with one or more wired or wireless devices such as a smartphone or the vehicle audio system. The seat assembly may be equipped with one or more device connection parts and power supplies, such as DC and AC converted supplies.

The first and second seat panels 32 and 34 may each include a padded seat base or seat back support structure and a cover material such as cloth, vinyl, leather or other cover layer. In some embodiments, the first and second seat panels 32 and 34 may include inflatable air bladders for adjusting the comfort of the seat base and seat back. Each of the first and second seat panels 32 and 34 may be contoured to a shape to form a seat base or a seat back that conforms to a passenger body that may be seated on the seat assembly 30 and the contour may be changed by adjusting the inflatable air bladders.

The first and second seat panels 32 and 34 are supported on a bracket 50 which, in turn, is connected to a guide 25 that supports the bracket 50 on one of the first and second seat track assemblies 26 and 28. The bracket 50 includes a pivot rod 54 operatively coupled to the first and second seat panels 32 and 34 via a seat support structure 78 that allows the first and second seat panels 32 and 34 to pivot together between the forward facing seat position and the rearward facing seat position. The guide 25 supports the bracket 50 on one of the first and second seat track assemblies 26 and 28 and allows the seat assemblies 30 to move on the first and second seat track assemblies 26 and 28. The guide 25 may include a roller 52 and a pair of guide wheels 56 and 58. As such, the roller 52 enables the bracket 50 to move forward and rearward on the first track assembly 26 and the second track assembly 28. The first seat panel 32 has a first connector shown as a latch 62 configured to matingly engage a second connector shown as a striker bolt 60 on first track assembly 26. Latch 62 may engage striker bolt 60 in the forward seating position to hold the seat assembly in a latched position and thereby prevent the seat assembly 30 from moving forward or rearward.

Figure 4A:
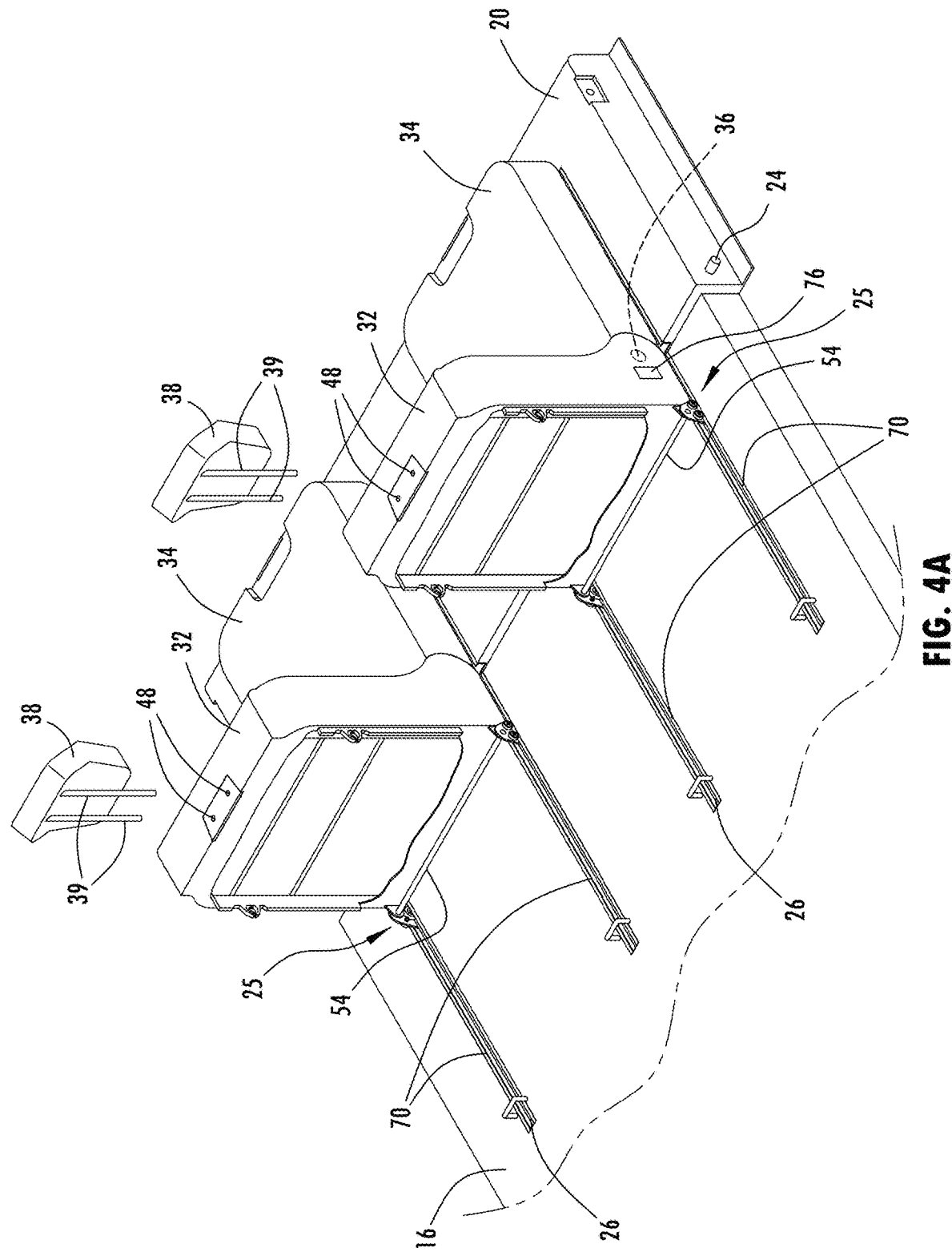
FIG. 4A is a front perspective view of the rear row of seating showing the seats transformed to a rear facing intermediate position with the vehicle lower tailgate open.
Figure 4B:
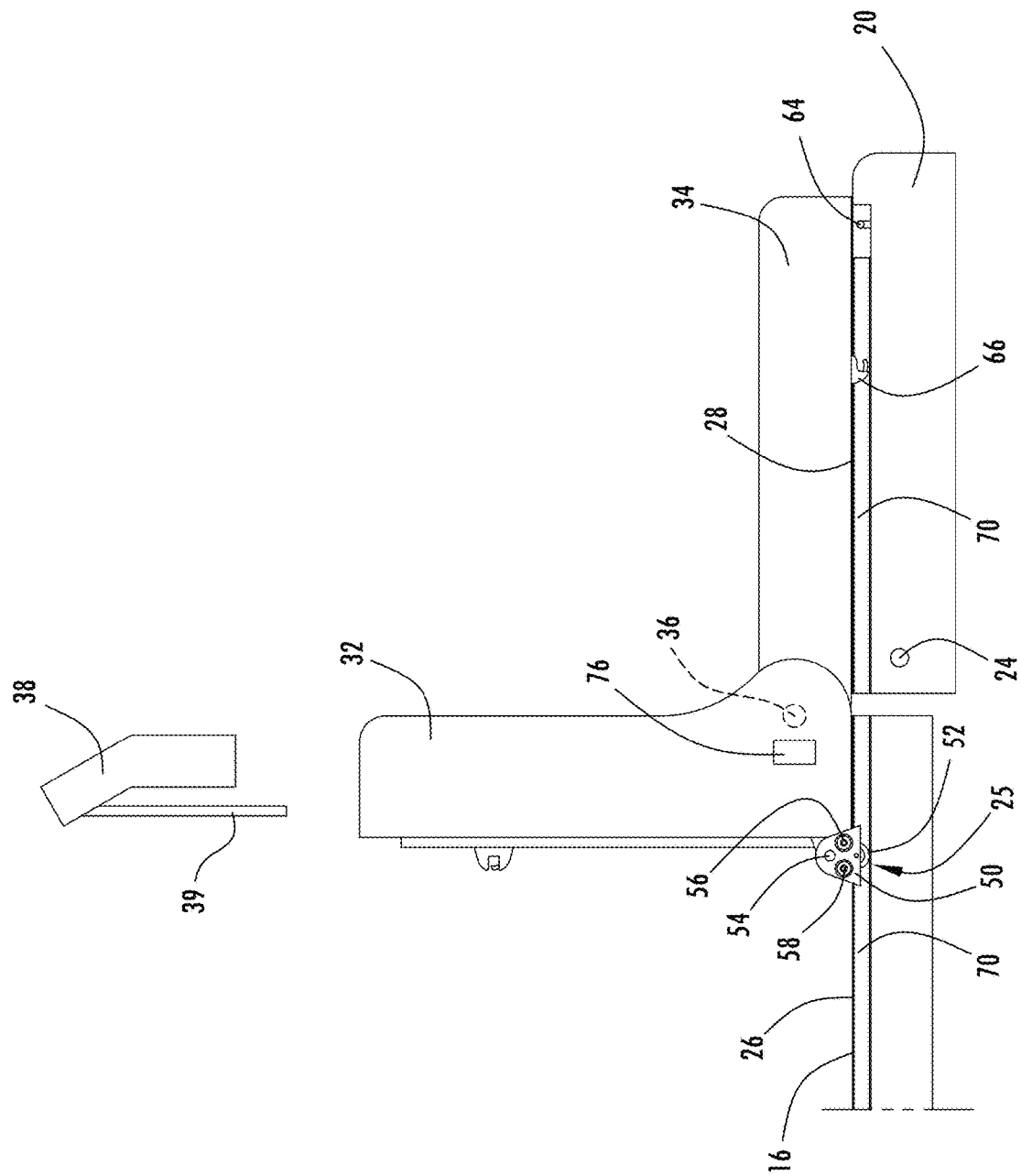
FIG. 4B is a side view of the rear row of seating in the rear facing intermediate position with the liftgate open as shown in FIG. 4A.

The seat assembly 30 may be transformed between the forward facing position shown in FIGS. 3A and 3B to an intermediate rearward facing seat position shown in FIGS. 4A and 4B. In doing so, the first and second seat panels 26 and 28 are rotated about pivot rod 54 on bracket 50 by an angle of about 90°. This may occur when the lower tailgate 20 is in the open position. In this rotated position, the first seat panel 32 serves as a seat back and the second seat panel 34 serves as a seat base. The headrest 38 may be removed from the connectors 48 on the second seat panel 28 and repositioned onto the connectors 48 provided on the first seat panel 26.

Figure 5A:
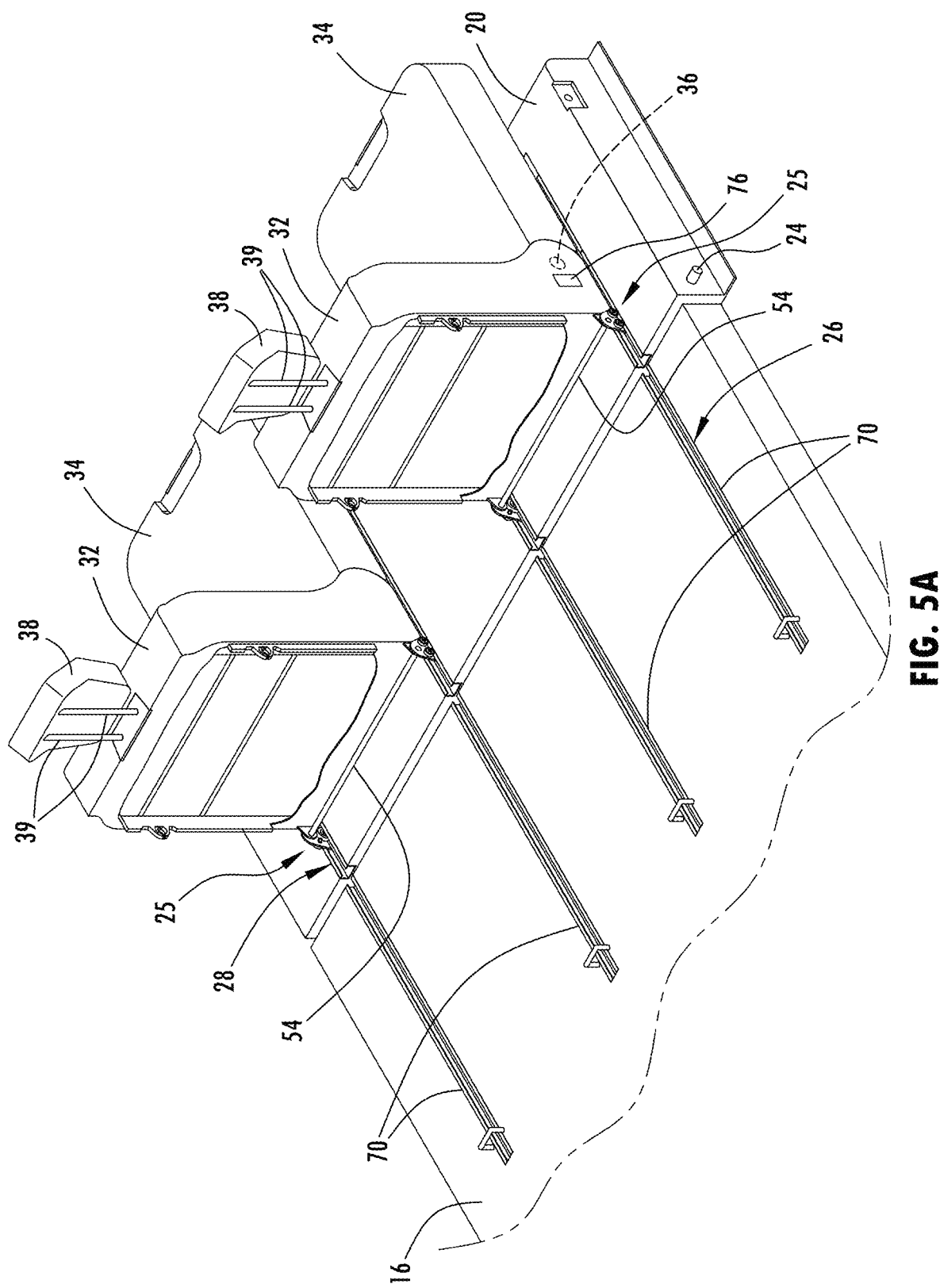
FIG. 5A is a front perspective view of the rear row of seating with the seats in the rear facing tailgating position on the open lower tailgate.
Figure 5B:
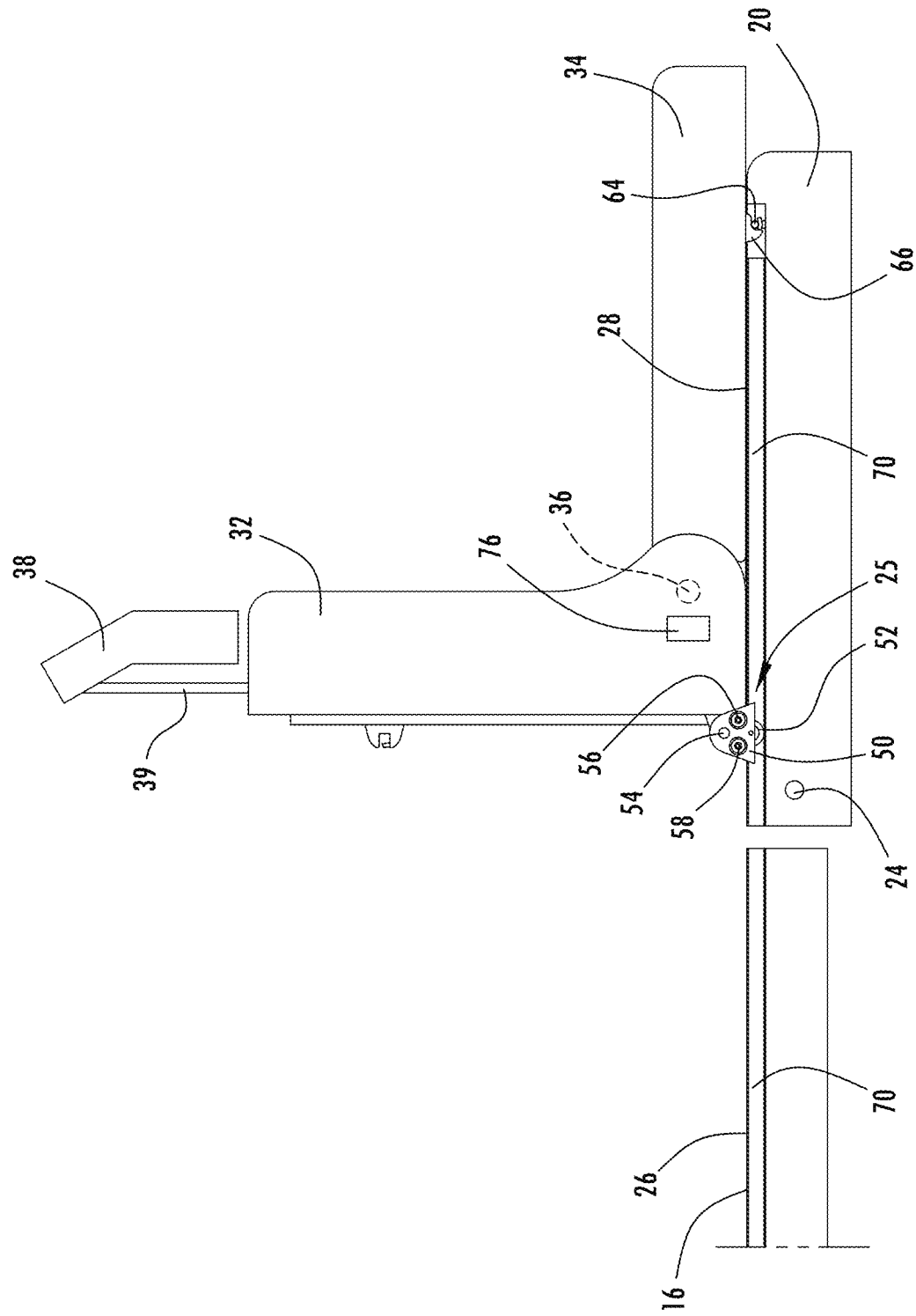
FIG. 5B is a side view of the rear row of seating in the rear facing tailgating position as shown in FIG. 5A.

The seat assembly 30 may be further moved rearward by sliding the bracket 50 on guide 25 along the first track assembly 26 rearward. With the lower tailgate 20 in the horizontal open position, the bracket 50 and guide 25 may slide out of the rear open end of the first track assembly 26 and onto the front open end of the second track assembly 28 provided on the lower tailgate 20. In doing so, the bracket 50 and guide 25 transition from the first track assembly 26 as shown in FIGS. 4A and 4B onto the second track assembly 28 as shown in FIGS. 5A and 5B. When the seat assembly 30 reaches a rearward most position as shown in FIGS. 5A and 5B, a third connector shown as a latch 66 on the second seat panel 34 engages a fourth connector shown as a striker bolt 64 on the second track assembly 28. In this rear facing latched position, the seat assembly 30 may be fixedly held in the tailgating position where a passenger may be seated at a position extending beyond the rearward most end of the lower tailgate 20.

Figure 6:
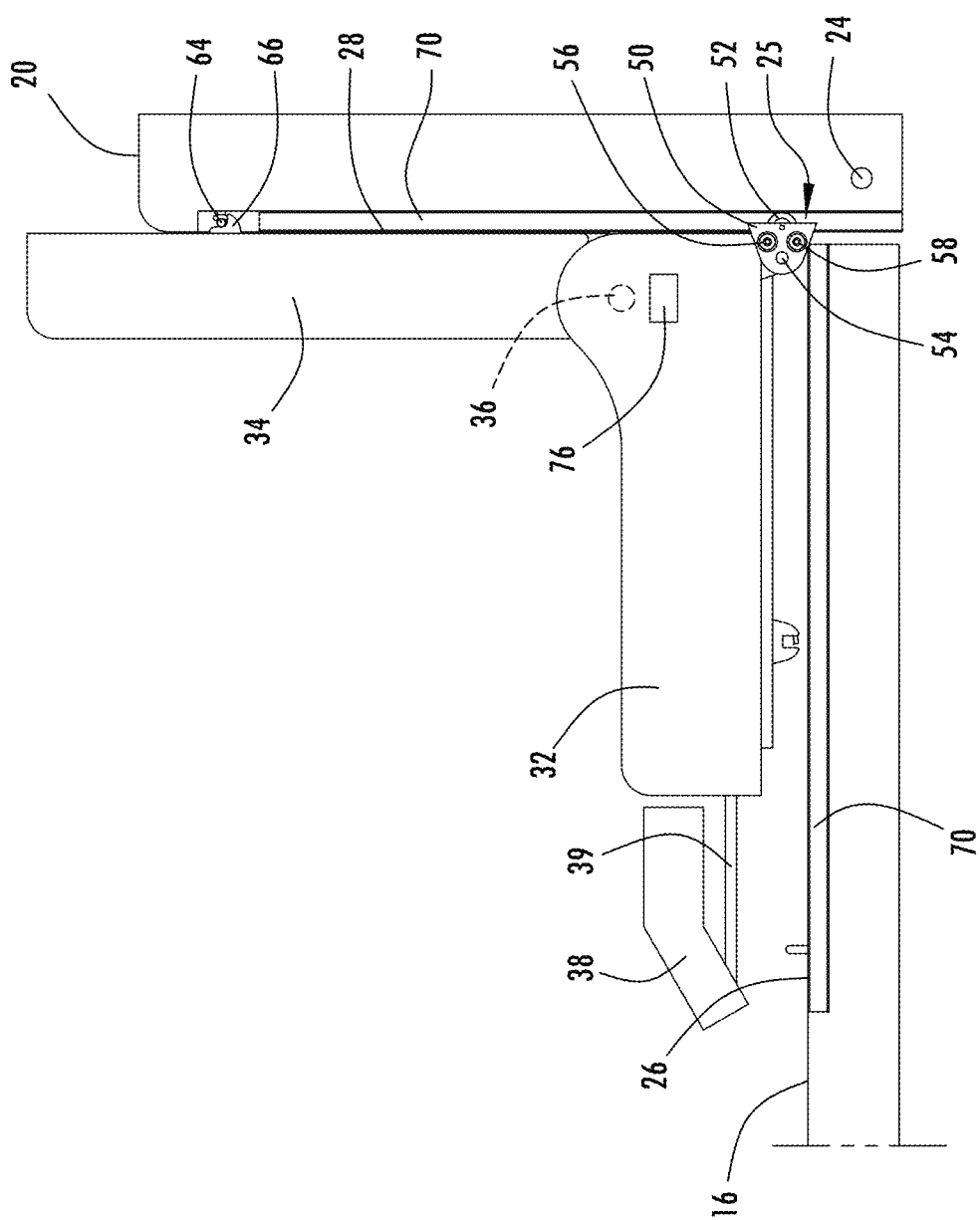
FIG. 6 is a side view of the rear row of seating with the seats stored on the tailgate and with the tailgate in the closed position.

The seat assembly 30 may further be stored on the lowermost tailgate 20 when the lower tailgate 20 is rotated upward to move to the vertical closed position as seen in FIG. 6. In this position, the first seat panel 32 may extend substantially horizontal and the second seat panel 34 may be latched via the third and fourth connectors and held in place. In this position, a portion of the cargo area of the vehicle 10 proximate to the first seat track assembly 26 may have more space available forward of the seat assembly 30 to store items.

Figure 8:
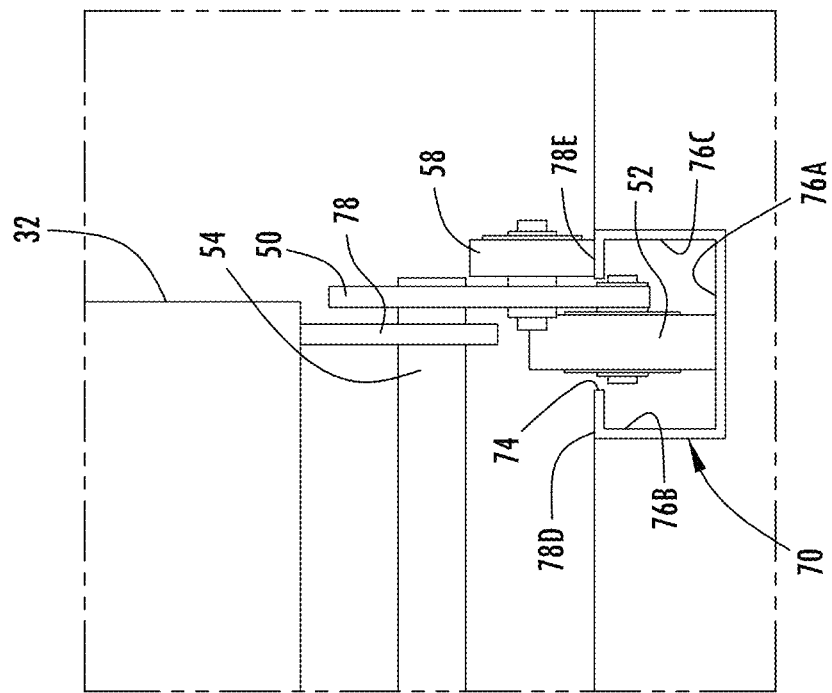
FIG. 8 is a front view of the pivot bracket assembly located on the track assembly as shown in FIG. 7.
Figure 7:
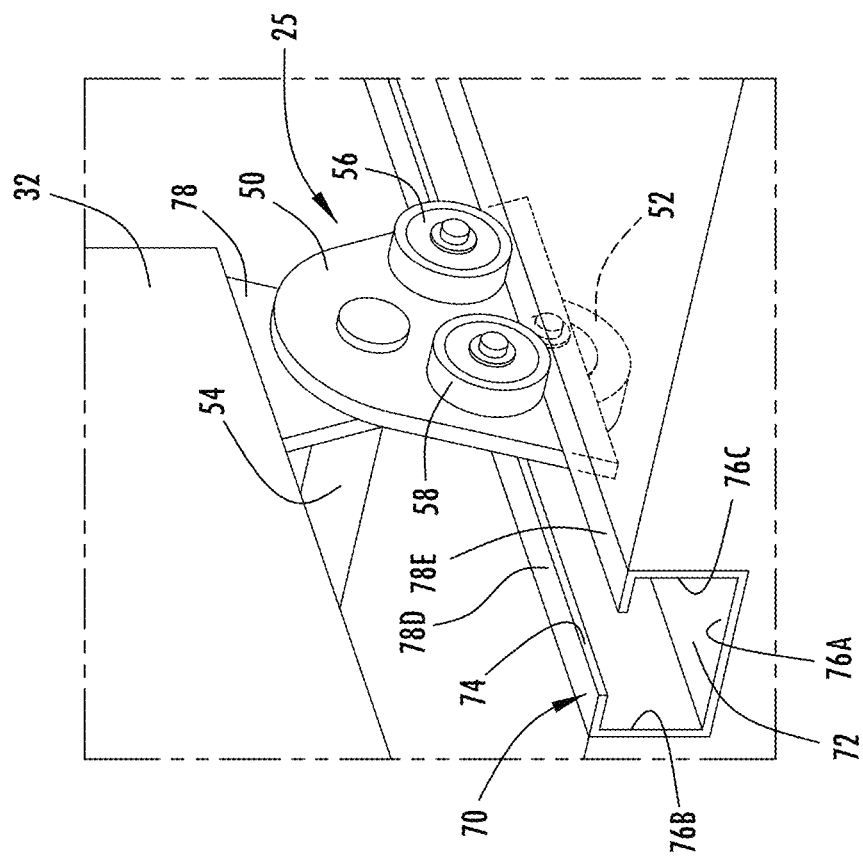
FIG. 7 is an enlarged perspective view of the pivot bracket assembly located on the track assembly.

The bracket 50 and guide 25 assembled on the seat track 70 of the track assembly are further illustrated in FIGS. 7 and 8. The seat track 70 is shown having a passageway 72 defined by lateral side walls 76B and 76C, lower walls 76A, and upper walls 76D and 76E which have an open slot 74 therebetween. The guide 25 has a roller 52 positioned within the passageway 72 and extending through the open slot 74 and connected to bracket 50. Bracket 50 supports the pivot rod 54 which pivotally supports a seat support structure 78 supporting the first and second seat panels. In addition, a pair of spring biased rollers 58 are positioned on top of upper wall 78E for spring-biased engagement of the guide 25 on the track 70. As such, the roller 52 of guide 25 and bracket 50 are easily movable along the track 70 between forward and rearward positions.

Accordingly, the vehicle 10 advantageously provides for a seating assembly 30 that provides vehicle forward facing seating for normal vehicle operation and is transformable to a rearward facing seat position in which the seat assembly 30 extends rearward of a tailgate to provide for tailgate seating when the vehicle is parked. The seating assembly 30 may be easily transformed between the two seating positions and may be stored on the lower tailgate when not in use.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
    a cabin interior;
    a floor;
    a tailgate at the rear end of the cabin interior, wherein at least a portion of the tailgate pivots between a vertical closed position and a horizontal open position;
    a first seat track assembly supported on the floor in the cabin interior;
    a second seat track assembly supported on the tailgate; and
    a seat assembly comprising:
        a first seat panel that serves as a seat base in a forward facing seat position;
        a second seat panel that serves as a seat back in the forward facing seat position;
        a bracket that allows the first and second seat panels to pivot between the forward facing seat position and a rearward facing seat position; and
        a guide supporting the bracket on one of the first and second seat track assemblies, wherein the seat assembly may slide rearward along the first seat track assembly and onto the second seat track assembly when the tailgate is in the open position.

2. The vehicle of claim 1, wherein the tailgate comprises a lower tailgate and an upper tailgate, wherein the second seat track assembly is supported on the lower tailgate.

3. The vehicle of claim 2, wherein the seat assembly may extend rearwardly of a rear end of the lower tailgate when the lower tailgate is in the open position.

4. The vehicle of claim 1, wherein the first seat track assembly comprises a first pair of seat tracks and the second seat track assembly comprises a second pair of seat tracks.

5. The vehicle of claim 1, wherein the seat assembly may be stored on the tailgate assembly when the tailgate assembly is in the closed position.

6. The vehicle of claim 1, wherein the guide comprises a roller and one or more spring biased supports, wherein the roller rolls within the track.

7. The vehicle of claim 1, wherein the seat assembly further comprises a headrest, wherein the headrest may be removably attached to the first seat panel or the second seat panel.

8. The vehicle of claim 1, wherein the first seat panel comprises a first connector for connecting onto a second connector on the floor of the vehicle when the seat assembly is in the forward facing seat position.

9. The vehicle of claim 8, wherein the second seat panel comprises a third connector for connecting onto a fourth connector on the tailgate when the seat assembly is in the rearward facing seat position.

10. The vehicle of claim 1, wherein the seat assembly is a rearward most seat assembly of the vehicle.

11. The vehicle of claim 10, wherein the vehicle comprises first and second seat assemblies, each seat assembly having a first seat panel, a second seat panel, a bracket, and a guide that enables the bracket to slide on a first pair of the first track assemblies on the floor and a second pair of second track assemblies on the tailgate.

12. The vehicle of claim 1, wherein the bracket allows the first seat panel and second seat panel to rotate together at an angle of about 90°.

13. The vehicle of claim 1, wherein the first seat panel serves as the seat back in the rearward facing seat position and the second seat panel serves as the seat based in the rearward facing seat position.

14. A vehicle comprising:
a cabin interior;
a floor;
a tailgate at the rear end of the cabin interior, wherein at least a portion of the tailgate pivots between a vertical closed position and a horizontal open position;
a first seat track assembly comprising a first pair of seat tracks supported on the floor in the cabin interior;
a second seat track assembly comprising a second pair of seat tracks supported on the tailgate; and
a rear seat assembly comprising:
a first seat panel that serves as a seat base in a forward facing seat position and serves as a seat back in a rearward facing seat position;
a second seat panel that serves as a seat back in the forward facing seat position and serves as the seat based in the rearward facing seat position;
a bracket that allows the first seat panel and the second seat panel to pivot together at an angle of about 90° between the forward facing position and the rearward facing position; and
a guide supporting the bracket on one of the first and second seat track assemblies, wherein the seat assembly may slide rearward along the first seat track assembly and onto the second seat track assembly when the tailgate is in the open position.

15. The vehicle of claim 14, wherein the tailgate comprises a lower tailgate and an upper tailgate, wherein the second seat track assembly is supported on the lower tailgate.

16. The vehicle of claim 15, wherein the seat assembly may extend rearwardly of a rear end of the lower tailgate when the lower tailgate is in the open position.

17. The vehicle of claim 14, wherein the seat assembly may be stored on the tailgate assembly when the tailgate assembly is in the closed position.

18. The vehicle of claim 14, wherein the guide comprises a roller and one or more spring biased supports, wherein the roller rolls within the track.

19. The vehicle of claim 14, wherein the seat assembly further comprises a headrest, wherein the headrest may be removably attached to the seat base or the seat back.

* * * * *